No. 607,273. Patented July 12, 1898.
C. H. PURDY.
COMBINED HOE AND EDGE TRIMMER.
(Application filed Dec. 28, 1897.)
(No Model.)
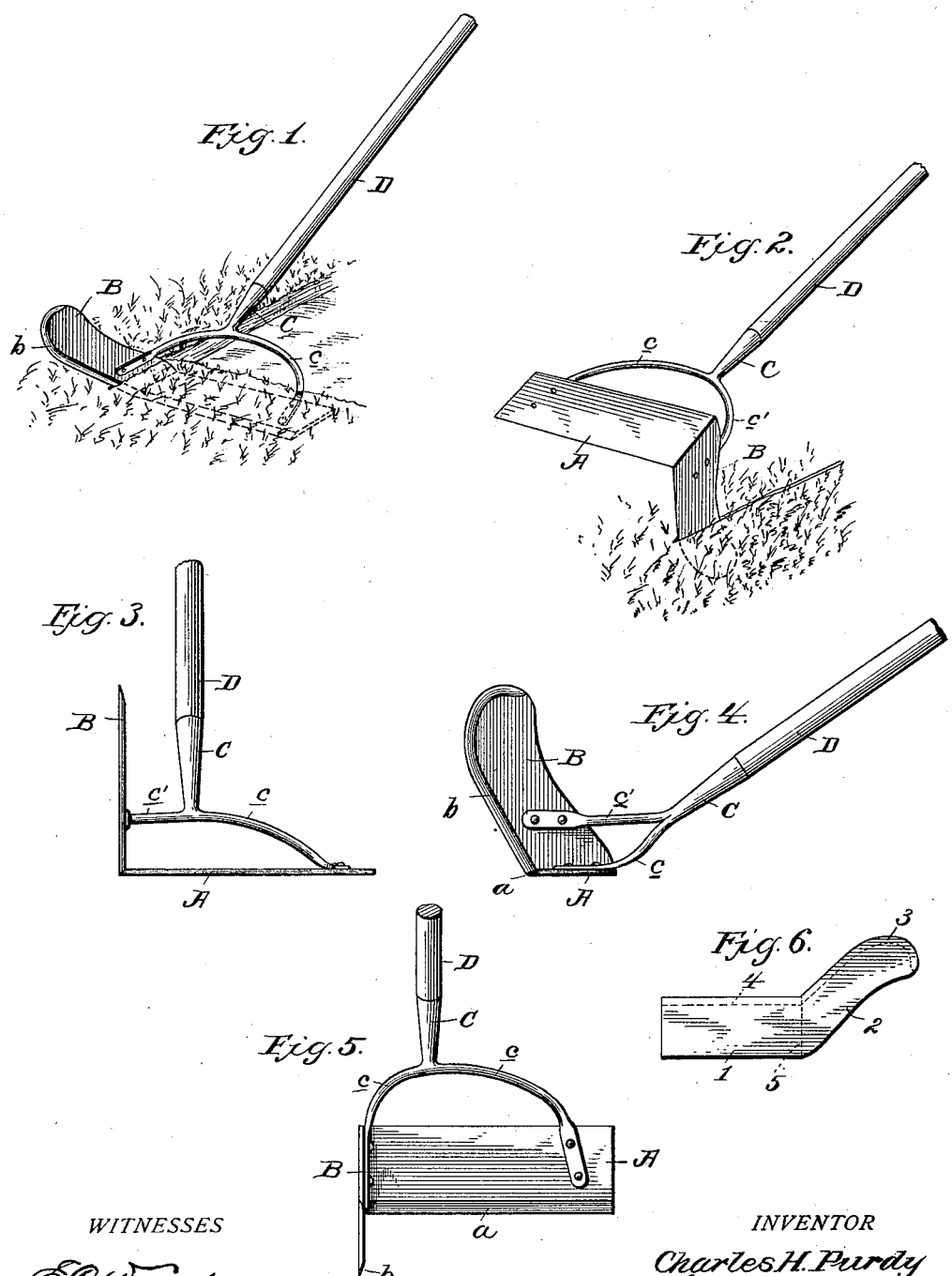
WITNESSES
INVENTOR
Charles H. Purdy
By J. Stockman
Attorney

UNITED STATES PATENT OFFICE.

CHARLES HOLMES PURDY, OF LYNBROOK, NEW YORK.

COMBINED HOE AND EDGE-TRIMMER.

SPECIFICATION forming part of Letters Patent No. 607,273, dated July 12, 1898.

Application filed December 28, 1897. Serial No. 663,853. (No model.)

*To all whom it may concern:*

Be it known that I, CHARLES HOLMES PURDY, a citizen of the United States, residing at Lynbrook, in the county of Queens and State of New York, have invented certain new and useful Improvements in a Combined Hoe and Edge-Trimmer; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to that class of garden implements designed to clear walks and trim the edges of lawns, &c.; and it consists in the novel construction thereof hereinafter described and claimed.

The object of the invention is to provide in the one article a horizontal hoe and an edge-trimmer so constructed that the two devices may be used at once or either employed independently of the other and wherein the blade for trimming the edges of lawns may not only be used independently of the hoe, but will more efficiently accomplish its purpose and require less exertion than those heretofore proposed.

In the accompanying drawings, illustrating the invention, Figure 1 is a perspective view of a device constructed in accordance with my invention, showing it in use for clearing a path and trimming the edge of a lawn at once. Fig. 2 is a perspective view of the device, showing it in the position it occupies while trimming the edge of a lawn only. Fig. 3 is a front elevation of the device. Fig. 4 is a side elevation of the device, looking at it from the right-hand side, while the parts are in the position shown in Fig. 1. Fig. 5 is a top plan view of the device, and Fig. 6 is a plan view of the blank from which the blades are formed.

The same letters and numerals of reference designate the same parts in the several figures.

The blades of the device are formed from the blank of sheet-steel or other suitable metal, (shown in Fig. 6,) consisting of an oblong, square, or other suitable rectangular end 1 and an end 2, extending at about an obtuse angle from said end 1 and having a rounded free end 3. The front longitudinal edges of these parts, including the edge 3, are beveled on the dotted lines 4 to form cutting edges, and the end 2 is bent vertically at right angles, with the end 1 on the dotted line 5. This forms a horizontal hoe-blade A, sharpened along its longitudinal front edge *a*, for clearing walks, &c., and a blade B, extending vertically from said blade A and having a forward sharpened edge extending forwardly in an inclined direction and terminating in a rearwardly-curved free edge, forming an inclined cutting-point. The blade B, which is intended to trim the edges of lawns, &c., will thus act to produce a shearing cut, whereby it may be operated with the greatest ease both when used alone and with the horizontal blade.

C designates the bail-socket, to which the handle D is attached. The arm *c* of the bail projects inclinatorily downward and is attached to the upper surface of the horizontal blade A, preferably at or near the longitudinal center thereof, and the arm *c'* of the bail extends approximately in a horizontal line from said socket and is secured to the blade B at about the center of the inner surface of the same.

A device thus constructed, in comparison with those heretofore proposed for accomplishing the same purposes, is simpler in construction in that it dispenses with one of the vertical blades, is more rigid in action, as the bail-arms are attached to the vertical and horizontal blades, respectively, in different horizontal planes, and is capable of being operated with greater ease because of the angles with which the cutting edge of the blade B extends in respect to the cutting edge of the blade A. Furthermore, the construction is advantageous over those referred to in that the blades may be inverted, as shown in Fig. 2, and the edge-trimming blade B used alone, in which use the cutting action will be produced principally, if not wholly, by the rearwardly-curved free cutting edge or point of said blade B, and the device will operate with greater ease and efficiency than the hand-tools for trimming edges heretofore proposed.

Having thus described my invention, what

I believe to be new and desire to secure by Letters Patent, and what I therefore claim, is—

1. The herein-described combined horizontal hoe and edge-trimmer, consisting of a horizontal hoe-blade, a vertical edge-trimming blade extending from one end of said hoe-blade and having a sharpened longitudinal edge and terminating in an inclined cutting-point, and a handle connected with said horizontal and vertical blades, substantially as described.

2. The herein-described combined horizontal hoe and edge-trimmer consisting of a horizontal hoe-blade, a vertical edge-trimming blade extending from one end only of said hoe-blade and having a forwardly-inclined cutting edge, and a handle-bail one arm of which is attached to said vertical blade and the other arm to said horizontal blade, substantially as shown and described.

3. The herein-described combined horizontal hoe and edge-trimmer, consisting of a horizontal blade, a vertical blade extending from one end of said horizontal blade, and having a forwardly-inclined cutting edge and formed with a rounded free cutting end, and a handle-bail, the arms of which are respectively attached to said horizontal and vertical blades, in different horizontal planes, substantially as described and for the purposes set forth.

In testimony whereof I affix my signature in presence of two witnesses.

CHAS. HOLMES PURDY.

Witnesses:
E. C. DARMSTADT,
E. A. DARMSTADT.